(12) United States Patent
Nakayoshi et al.

(10) Patent No.: US 6,888,596 B2
(45) Date of Patent: May 3, 2005

(54) LIQUID CRYSTAL DISPLAY DEVICE

(75) Inventors: Yoshiaki Nakayoshi, Ooamishirasato (JP); Nagatoshi Kurahashi, Mobara (JP); Kazuhiko Yanagawa, Mobara (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 10/201,920

(22) Filed: Jul. 25, 2002

(65) Prior Publication Data

US 2003/0058388 A1 Mar. 27, 2003

(30) Foreign Application Priority Data

Sep. 21, 2001 (JP) .......................................... 2001-289259

(51) Int. Cl.⁷ .......................................... G02F 1/1335
(52) U.S. Cl. ...................... 349/113; 349/155; 349/156
(58) Field of Search .................... 349/113, 106, 349/155, 156

(56) References Cited

U.S. PATENT DOCUMENTS

| | | | |
|---|---|---|---|
| 5,594,572 A | | 1/1997 | Fukutani et al. |
| 5,917,567 A | * | 6/1999 | Oh et al. .................... 349/113 |
| 6,184,956 B1 | * | 2/2001 | Kang et al. ................. 349/113 |
| 6,219,122 B1 | * | 4/2001 | Uchida et al. .............. 349/117 |
| 6,278,508 B1 | | 8/2001 | Ogawa et al. |
| 6,429,919 B1 | * | 8/2002 | Takatsuka et al. .......... 349/113 |
| 6,433,852 B1 | * | 8/2002 | Sonoda et al. .............. 349/156 |
| 6,473,145 B1 | * | 10/2002 | Shim et al. ................. 349/113 |
| 6,476,888 B2 | * | 11/2002 | Yamanashi .................. 349/106 |
| 6,507,385 B1 | | 1/2003 | Nishiyama et al. |
| 6,535,264 B1 | | 3/2003 | Imabayashi et al. |
| 6,606,139 B2 | * | 8/2003 | Yoshii et al. ............... 349/114 |
| 6,671,025 B1 | * | 12/2003 | Ikeda et al. ................ 349/156 |
| 6,704,075 B2 | * | 3/2004 | Takizawa et al. ........... 349/106 |

FOREIGN PATENT DOCUMENTS

| | | |
|---|---|---|
| EP | 1 059 557 A1 | 12/1999 |
| EP | 1 072 931 A2 | 7/2000 |
| JP | 11-109366 | 9/1997 |
| JP | 11-109390 | 9/1997 |
| JP | 2001-133787 | 10/1999 |
| JP | 2000-310784 | 2/2000 |

* cited by examiner

*Primary Examiner*—Thien M. Le
*Assistant Examiner*—Daniel A. Hess
(74) *Attorney, Agent, or Firm*—Reed Smith LLP; Stanley P. Fisher, Esq.; Juan Carlos A. Marquez, Esq.

(57) ABSTRACT

A liquid crystal display device in which the accuracy of the gap between its substrates can be improved includes a reflector formed in at least a part of each pixel area on a liquid-crystal-side surface of one of substrates disposed in opposition to each other with a liquid crystal interposed therebetween, the reflector serving to reflect light incident from the other substrate, an uneven portion formed on a reflection surface of the reflector, and columnar spacers formed on a liquid-crystal-side surface of the other substrate. Each of the columnar spacers is disposed with its vertex portion being opposed to a convex portion of the reflector.

9 Claims, 7 Drawing Sheets

LIQUID CRYSTAL DISPLAY DEVICE

BACKGROUND OF THE INVENTION

1. Field of the Invention

The present invention relates to a liquid crystal display device and, more particularly, to a liquid crystal display device which is called a reflection type, a partially transparent type, or a slightly transparent type.

2. Background Art

A liquid crystal display device has a pair of substrates disposed in opposition to each other with a liquid crystal layer interposed therebetween, and a multiplicity of pixels are arranged in the spreading direction of the liquid crystal layer.

A unit for generating an electric field is formed in each of the pixels so that the optical transmissivity of the liquid crystal is controlled by the electric field.

Accordingly, the liquid crystal display device needs light to be transmitted through each of the pixels, and such a liquid crystal display device is known that which uses external light such as sunlight for the purpose of reducing power consumption.

A liquid crystal display device called a reflection type is reflect external light transmitted through its liquid crystal layer from an observer side to be totally reflected toward the observer side by means of a reflector provided in each pixel. A liquid crystal display device called a partly transparent type, a slightly transparent type or a semi-transparent type is provided a backlight in the liquid crystal display device so that light from the backlight is transmitted through a part of each of the pixels and a reflector is formed in the remaining part of each of the pixels so that external light from an observer side is reflected.

Such a liquid crystal display device has a reflector provided in each of the pixels, and it is known that there is a liquid crystal display device including reflectors having uneven portions formed on their entire reflection surfaces. In this liquid crystal display device, the uneven portions are used to produce scattering of reflected light to prevent mirror reflection, thereby preventing a problem such as a reflection of the face of an observer in the display screen of the device.

SUMMARY OF THE INVENTION

However, in the liquid crystal display device constructed in this manner, the unevenness of the uneven portion of each of the reflectors appear directly on the liquid-crystal-side surface of a substrate on which the reflectors are formed.

Therefore, it has been pointed out that bead-shaped spacers for ensuring the gap between the substrate and the other substrate disposed in opposition to each other with the liquid crystal layer interposed therebetween are placed in convex portions or concave portions of the reflectors, so that the accuracy of the gap is degraded.

As a method of solving this problem, it is considered to increase the number of bead-shaped spacers. However, even this method cannot avoid a problem which lowers the contrast of display.

The invention has been made in view of such a problem, and provides a liquid crystal display device in which the accuracy of the gap between its substrates is improved. Representative aspects of the invention disclosed in the present application will be described below in brief.

(1) A liquid crystal display device according to the invention includes, for example, a reflector formed in at least a part of each pixel area on a liquid-crystal-side surface of one of substrates disposed in opposition to each other with a liquid crystal layer interposed therebetween, the reflector serving to reflect light incident from the other substrate, an uneven portion formed on a reflection surface of the reflector, and columnar spacers formed on a liquid-crystal-side surface of the other substrate. Each of the columnar spacers is disposed with its vertex portion being opposed to a convex portion of the reflector.

(2) A liquid crystal display device according to the invention includes, for example, a reflector formed in at least a part of each pixel area on a liquid-crystal-side surface of one of substrates disposed in opposition to each other with a liquid crystal layer interposed therebetween, the reflector serving to reflect light incident from the other substrate, an uneven portion formed on a reflection surface of the reflector, and columnar spacers formed on a liquid-crystal-side surface of the other substrate. Each of the columnar spacers is disposed with its vertex portion being opposed to a convex portion of the reflector and being not opposed to other convex portions adjacent to the convex portion.

(3) A liquid crystal display device according to the invention includes, for example, a plurality of gate signal lines disposed to be juxtaposed on a liquid-crystal-side surface of one of substrates disposed in opposition to each other with a liquid crystal layer interposed therebetween, a plurality of drain signal lines disposed to be juxtaposed to intersect the plurality of gate signal lines on the liquid-crystal-side surface of the one of the substrates, and pixel areas each of which is made of an area surrounded by adjacent ones of the plurality of gate signal lines and adjacent ones of the plurality of drain signal lines. Each of the pixel areas is provided with a switching element to be operated by a scanning signal from a gate signal line and a pixel electrode to which an image signal from a drain signal line is supplied via the switching element. The pixel electrode has a reflector function and is formed on an upper surface of a protective film made of an organic material layer formed to cover the drain signal line and the switching element. A light scattering surface which reflects unevenness of an uneven portion formed on the upper surface of the protective film is formed on a surface of the pixel electrode. An insulating film which is disposed to overlap the drain signal line and to be extended in a running direction of the drain signal line is formed in a layer underlying the protective film.

(4) A liquid crystal display device according to the invention includes, for example, a plurality of gate signal lines disposed to be juxtaposed on a liquid-crystal-side surface of one of substrates disposed in opposition to each other with a liquid crystal layer interposed therebetween, a plurality of drain signal lines disposed to be juxtaposed to intersect the plurality of gate signal lines on the liquid-crystal-side surface of the one of the substrates, and pixel areas each of which is made of an area surrounded by adjacent ones of the plurality of gate signal lines and adjacent ones of the plurality of drain signal lines. Each of the pixel areas is provided with a switching element to be operated by a scanning signal from a gate signal line and a pixel electrode to which an image signal from a drain signal line is supplied via the switching element. The pixel electrode has a reflector function and is formed on an upper surface of a protective film made of an organic material layer formed to cover the drain signal line and the switching element. A light scattering surface which reflects unevenness of an uneven portion formed on the upper surface of the protective film is formed on a surface of the pixel electrode.

A convex portion formed on the protective film over the drain signal line is set to be larger in film thickness than other convex portions.

(5) A liquid crystal display device according to the invention, for example, presumes the construction described in (4), and columnar spacers are formed on a liquid-crystal-side surface of the other substrate and each of the columnar spacers is disposed with its vertex portion opposed to a part of the drain signal line.

(6) A liquid crystal display device according to the invention includes, for example, a reflector formed in at least a part of each pixel area on a liquid-crystal-side surface of one of substrates disposed in opposition to each other with a liquid crystal layer interposed therebetween, the reflector serving to reflect light incident from the other substrate, and a light scattering surface formed on the upper surface of the organic material layer, the light scattering surface reflecting unevenness of an uneven portion formed on the upper surface of the organic material layer. The uneven portion formed on the upper surface of the organic material layer is formed by etching with photolithography techniques using a photomask having amounts of light transmission adjusted according to its contour lines.

(7) A liquid crystal display device according to the invention includes, for example, a reflector formed in at least a part of each pixel area on a liquid-crystal-side surface of one of substrates disposed in opposition to each other with a liquid crystal layer interposed therebetween, the reflector serving to reflect light incident from the other substrate, an uneven portion formed on a reflection surface of the reflector, the reflector being provided close to a liquid crystal to such an extent that the liquid crystal is varied in layer thickness by the uneven portion, and spacers interposed between the one and the other of the substrates and made of bead-shaped spacers and columnar spacers. The columnar spacers are secured to the other substrate and each of the columnar spacers is disposed with its vertex portion opposed to a convex portion of the reflector.

(8) A liquid crystal display device according to the invention presumes, for example, the construction described in (7), and the columnar spacers are greater in number per one or more pixel areas than the bead-shaped spacers.

(9) A liquid crystal display device according to the invention presumes, for example, the construction described in (7), and each of the bead-shaped spacers has elasticity, and has a diameter set to be greater than a height of each of the columnar spacers.

(10) A liquid crystal display device according to the invention includes, for example, a reflector formed in at least a part of each pixel area on a liquid-crystal-side surface of one of substrates disposed in opposition to each other with a liquid crystal layer interposed therebetween, the reflector serving to reflect light incident from the other substrate, an uneven portion formed on a reflection surface of the reflector, the reflector being provided close to a liquid crystal to such an extent that the liquid crystal is varied in layer thickness by the uneven portion, and spacers interposed between the one and the other of the substrates and made of bead-shaped spacers and columnar spacers. The columnar spacers are secured to the other substrate and each of the columnar spacers is disposed with its vertex portion opposed to a convex portion of the reflector. At least one of the substrates is set to be less than 0.5 mm in thickness, and each of the bead-shaped spacers has elasticity and has a diameter set to be greater than a height of each of the columnar spacers.

(11) A liquid crystal display device according to the invention includes, for example, a reflector formed in at least a part of each pixel area on a liquid-crystal-side surface of one of substrates disposed in opposition to each other with a liquid crystal layer interposed therebetween, the reflector serving to reflect light incident from the other substrate, an uneven portion formed on a reflection surface of the reflector, the reflector being provided close to a liquid crystal to such an extent that the liquid crystal is varied in layer thickness by the uneven portion, and spacers interposed between the one and the other of the substrates and made of bead-shaped spacers and columnar spacers. The columnar spacers are secured to the other substrate and each of the columnar spacers is disposed with its vertex portion opposed to a convex portion of the reflector. At least one of the substrates is made of plastic or resin, and each of the bead-shaped spacers has elasticity and has a diameter set to be greater than a height of each of the columnar spacers.

(12) A liquid crystal display device according to the invention includes, for example, a reflector formed in at least a part of each pixel area on a liquid-crystal-side surface of one of substrates disposed in opposition to each other with a liquid crystal layer interposed therebetween, the reflector serving to reflect light incident from the other substrate, an uneven portion formed on a reflection surface of the reflector, and columnar spacers formed on a liquid-crystal-side surface of the other substrate. Each of the columnar spacers being disposed with its vertex portion opposed to a convex portion of the reflector but not opposed to other convex portions adjacent to the convex portion. A light-shielding film which overlaps each of the columnar spacer and covers a peripheral portion thereof is interposed between each of the columnar spacers and the other substrate.

BRIEF DESCRIPTION OF THE DRAWINGS

The invention will become more readily appreciated and understood from the following detailed description of preferred embodiments of the invention when taken in conjunction with the accompanying drawings, in which.

DETAILED DESCRIPTION OF THE INVENTION

Embodiments of the liquid crystal display device according to the invention will be described below with reference to the accompanying drawings.

Embodiment 1.

<<Equivalent Circuit Diagram>>

Figure 2:
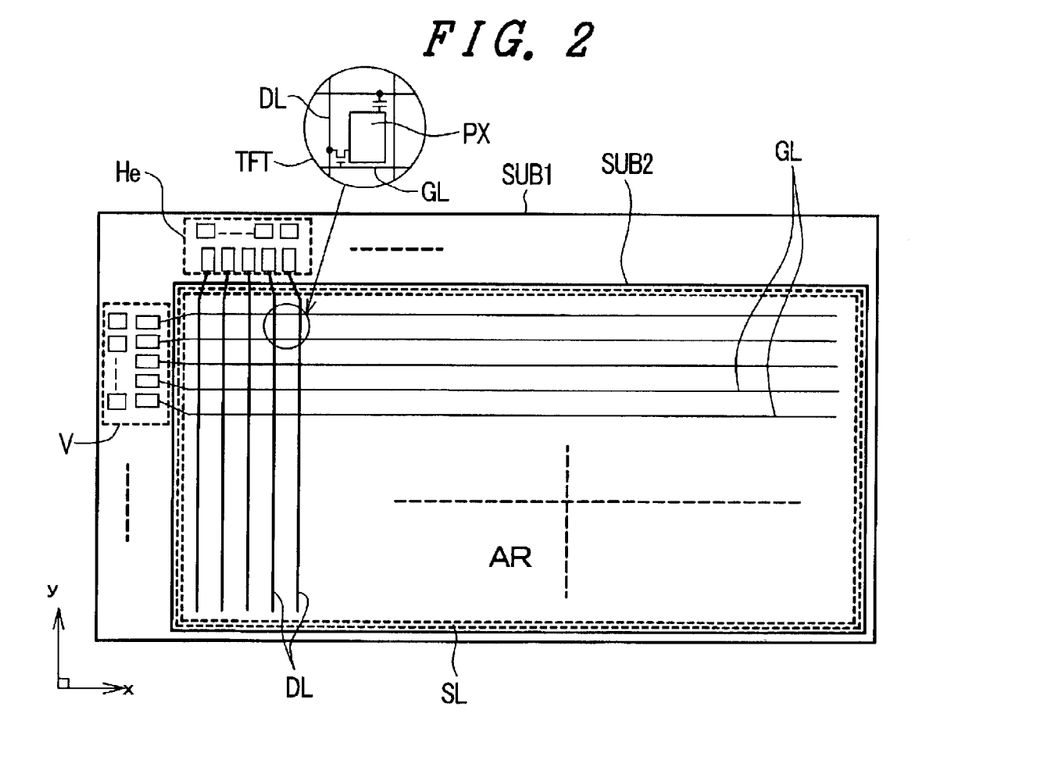
FIG. 2 is an equivalent circuit diagram showing one embodiment of the liquid crystal display device according to the invention.

FIG. 2 is an equivalent circuit diagram showing one embodiment of the liquid crystal display device according to the invention.

Referring to FIG. 2, a pair of transparent substrates SUB1 and SUB2 are disposed to be opposed to each other with a liquid crystal layer interposed therebetween, and the liquid crystal layer is sealed by a sealing material SL which also serves to secure the transparent substrate SUB1 to the transparent substrate SUB2.

Gate signal lines GL and drain signal lines DL are formed on a liquid-crystal-side surface of the transparent substrate SUB1 in an area surrounded by the sealing material SL. The gate signal lines GL are disposed to be extended in the x direction and to be juxtaposed in the y direction as viewed in FIG. 2, while the drain signal lines DL are disposed to be extended in the y direction and to be juxtaposed in the x direction as viewed in FIG. 2.

Areas each of which is surrounded by adjacent ones of the gate signal lines GL and adjacent ones of the drain signal lines DL constitute pixel areas, respectively, and a matrix-formed aggregation of these pixel areas constitutes a liquid crystal display part AR.

A thin film transistor TFT and a pixel electrode PX are formed in each of the pixel areas. The thin film transistor TFT is driven by a scanning signal from one of the adjacent gate signal lines GL, and a video signal is supplied to the pixel electrode PX from one of the adjacent drain signal lines DL via the thin film transistor TFT.

The pixel electrode PX is arranged to generate a voltage difference between the pixel electrode PX and a transparent counter electrode CT which is formed in common to each of the pixel areas on the transparent substrate SUB2, whereby the optical transmissivity of the liquid crystal is controlled by the voltage difference.

One end of each of the gate signal lines GL is formed to be extended beyond the sealing material SL, and the extended end constitutes a terminal to which an output terminal of a vertical scanning driver circuit V is connected. Signals from a printed circuit board which is disposed outside a liquid crystal display panel are inputted to input terminals of the vertical scanning driver circuit V.

The vertical scanning driver circuit V is made of a plurality of semiconductor devices, and mutually adjacent ones of the gate signal lines GL are grouped and one semiconductor device is assigned to each group.

Similarly, one end of each of the drain signal lines DL is formed to be extended beyond the sealing material SL, and the extended end constitutes a terminal to which an output terminal of a video signal driver circuit He is connected. Signals from a printed circuit board which is disposed outside the liquid crystal display panel are inputted to input terminals of the video signal driver circuit He.

The video signal driver circuit He is made of a plurality of semiconductor devices, and mutually adjacent ones of the drain signal lines DL are grouped and one semiconductor device is assigned to each group.

Incidentally, the semiconductor devices used in the vertical scanning driver circuit V and the video signal driver circuit He need not necessarily be limited to those arranged in the above-described manner, and may also be, for example, semiconductor devices formed by a film carrier method. In addition, it goes without saying that the vertical scanning driver circuit V and the video signal driver circuit He may also be circuits formed directly on the surface of the transparent substrate SUB1.

Each one of the gate signal lines GL is sequentially selected by a scanning signal from the vertical scanning driver circuit V.

In addition, a video signal is supplied to each of the drain signal lines DL by the video signal driver circuit He in synchronism with the timing of selection of each one of the gate signal lines GL.

<<Construction of Pixel>>

Figure 1:
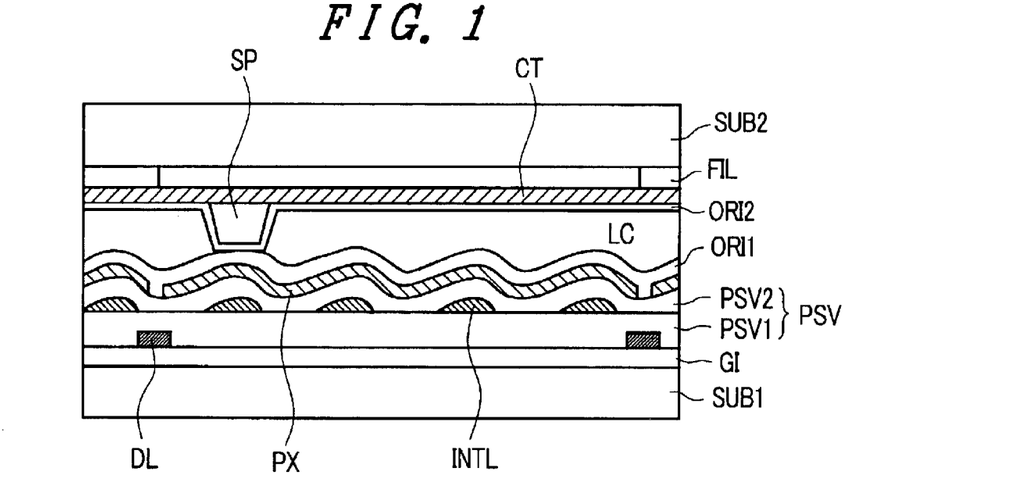
FIG. 1 is a cross-sectional view taken along line I—I of FIG. 3, showing one embodiment of the liquid crystal display device according to the invention.
Figure 3:
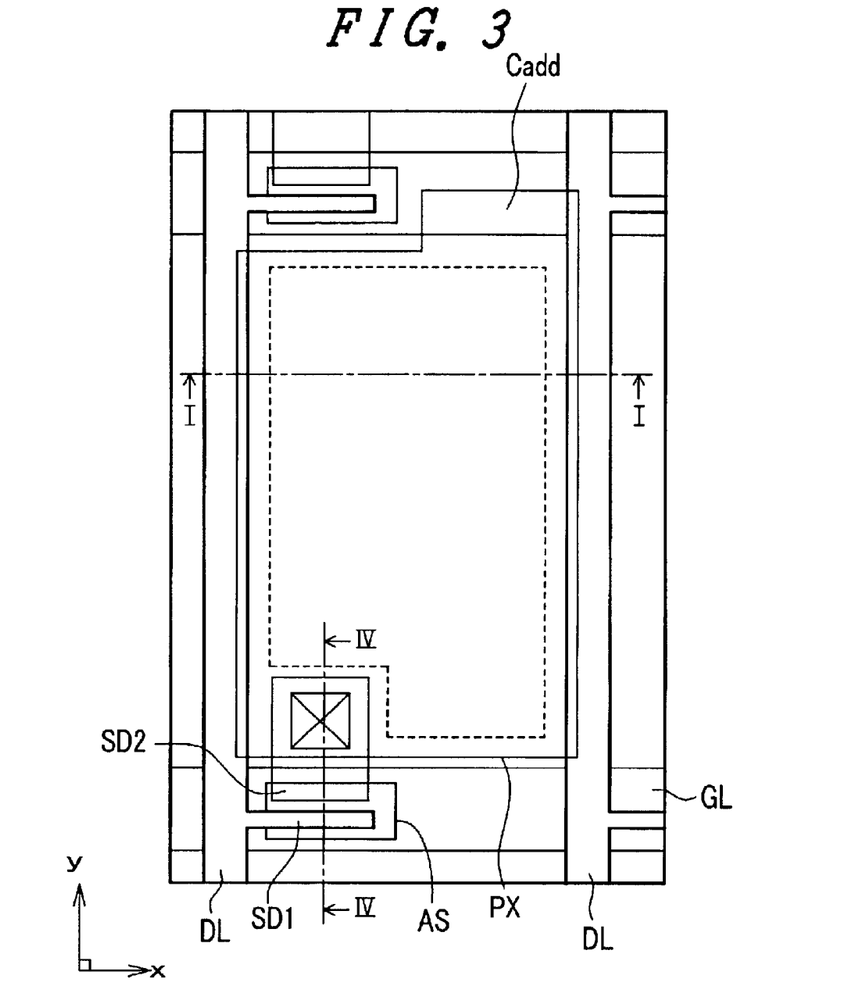
FIG. 3 is a plan view showing one embodiment of a pixel area of the liquid crystal display device according to the invention.

FIG. 3 is a plan view showing the construction of the pixel area of above-described liquid crystal display device which is generally called a reflection type. FIG. 1 is a cross-sectional view taken along line I—I of FIG. 3, and FIG. 4 is a cross-sectional view taken along line IV—IV of FIG. 3.

Figure 4:
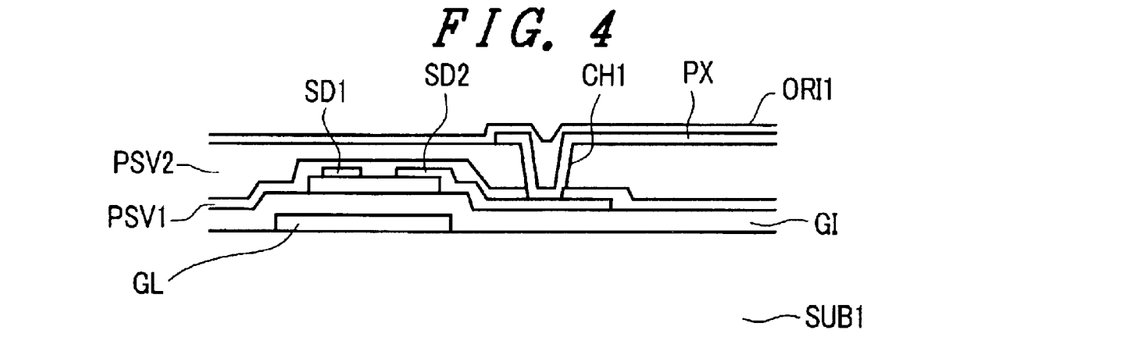
FIG. 4 is a cross-sectional view taken along line IV—IV of FIG. 3.

As shown in FIG. 4, a pair of gate signal lines GL which are disposed to be extended in the x direction and to be juxtaposed in the y direction are formed on the liquid-crystal-side surface of the transparent substrate SUB1.

These gate signal lines GL and a pair of drain signal lines DL which will be described later surround a rectangular area so that this rectangular area is constructed as a pixel area.

An insulating film GI made of, for example, SiN is formed to cover the gate signal lines GL on the surface of the transparent substrate SUB1 on which the gate signal lines GL are formed in the above-described manner.

This insulating film GI has the function of an interlayer insulating film between the gate signal lines GL and the drain signal lines DL (to be described later) in an area in which the drain signal lines DL are formed, the function of a gate insulating film for a thin film transistor TFT (to be described later) in an area in which the thin film transistor TFT is formed, and the function of a dielectric film for a capacitance element Cadd (to be described later) in an area in which the capacitance element Cadd is formed.

A semiconductor layer AS made of, for example, amorphous Si is formed on a surface of the insulating film GI in such a manner as to overlap a part of the gate signal line GL. Incidentally, it goes without saying that the material of the semiconductor layer AS need not necessarily be limited to amorphous Si and may also be, for example, poly-Si.

This semiconductor layer AS constitutes the semiconductor layer of the thin film transistor TFT, and a drain electrode SD1 and a source electrode SD2 are formed on the upper surface of the semiconductor layer AS, thereby forming a reversed staggered structure MIS transistor which uses a part of the gate signal line GL as its gate electrode. As a matter of course, a planar transistor may be used, particularly in the case of poly-Si.

The drain electrode SD1 and the source electrode SD2 are formed at the same time that the drain signal line DL is formed.

Specifically, the drain signal lines DL which are disposed to be extended in the y direction and to be juxtaposed in the x direction as viewed in FIG. 3 are formed, and a part of each of the drain signal lines DL is formed to be extended onto the upper surface of the semiconductor layer AS to form the drain electrode SD1. The source electrode SD2 is formed to be spaced apart from the drain electrode SD1 by a distance equivalent to the channel length of the thin film transistor TFT.

This source electrode SD2 is formed to be slightly extended from the upper surface of the semiconductor layer AS onto the upper surface of the insulating film GI within the pixel area, thereby forming a contact part for providing connection to the pixel electrode PX which will be described later.

Incidentally, a thin layer doped with high concentrations of impurities is formed at the interface between the semiconductor layer AS and each of the source electrode SD2 and the drain electrode SD1. This layer functions as a contact layer.

This contact layer can be formed, for example, by the process of forming a high-concentration impurity layer on the surface of the semiconductor layer AS at the same time as the formation of the semiconductor layer AS, and etching the impurity layer exposed from a mask formed by a pattern made of the drain electrode SD1 and the source electrode SD2 formed on the upper surface of the high-concentration impurity layer.

A protective film PSV which is made of, for example, SiN is formed on the surface of the transparent substrate SUB1 on which the thin film transistors TFT, the drain signal lines DL, the drain electrodes SD1 and the source electrodes SD2 are formed in the above-described manner. This protective film PSV constitutes a layer for preventing direct contact between the thin film transistors TFT and the liquid crystal to prevent characteristic degradation of the thin film transistors TFT.

This protective film PSV is made of a stacked structure in which a protective film PSV1 formed by an inorganic material layer made of, for example, SIN and an organic film PSV2 formed by an organic material layer made of, for example, resin film are stacked in that order.

In order that an uneven portion be formed on a surface of the protective film PSV2, intermediate layers INTL are respectively formed at locations corresponding to the convex portions of the uneven portion between the protective film PSV2 and the protective film PSV1.

Each of these intermediate layers INTL is made of a material such as a resin, and is formed, for example, in a predetermined pattern by selective etching using so-called photolithography techniques.

The uneven portion is formed on the surface of the protective film PSV2 which is formed to cover the intermediate layers INTL.

Pixel electrodes PX are formed on the upper surface of the protective film PSV2. The pixel electrodes PX are made of, for example, an Al film of good reflection efficiency.

Accordingly, the pixel electrodes PX also serve the function of a reflector in the reflection type liquid crystal display device, and an uneven surface which reflects the unevenness of the surface of the protective film PSV2 is formed on each of the pixel electrodes PX.

As described above, the uneven surface produces diffusion of reflected light to prevent mirror reflection, thereby preventing a problem such as a reflection of the face of an observer in the screen of the liquid crystal display device.

As shown in FIG. 3, the pixel electrode PX is formed to occupy a certain part of the pixel area, but to avoid the area in which the thin film transistor TFT is formed. A part of the pixel electrode PX is electrically connected to the source electrode SD2 of the thin film transistor TFT via a contact hole CH1 formed in a part of each of the protective films PSV2 and PSV1.

Furthermore, a part of the pixel electrode PX is formed to be extended to a location above the other adjacent gate signal line GL different from the gate signal line GL which drives the thin film transistor TFT, thereby forming a portion which overlaps the other adjacent gate signal line GL. At that portion, a capacitance element Cadd which uses the protective films PSV2 and PSV1 as its dielectric film is formed between the pixel electrode PX and the other adjacent gate signal line GL.

This capacitance element Cadd has, for example, the function of causing a video signal supplied to the pixel electrode PX to be stored therein for a comparatively long time.

An alignment layer ORI1 is formed to cover the pixel electrodes PX on the upper surface of the transparent substrate SUB1 on which the pixel electrodes PX are formed in the above-described manner. The alignment layer ORI1 is a film which is in direct contact with the liquid crystal, and serves to determine the initial alignment direction of molecules of the liquid crystal by means of rubbing formed on the surface of the alignment layer ORI1.

As a matter of course, a non-rubbing method such as a vertical alignment method may also be used.

Color filters FIL and the counter electrode CT which is formed of transparent electrode, for example, ITO (Indium Tin Oxide) in common to each of the pixel areas are formed in that order on the liquid-crystal-side surface of the transparent substrate SUB2 disposed to be opposed to the transparent substrate SUB1 constructed in the above-described manner with the liquid crystal interposed therebetween.

Spacers SP for ensuring the gap between the transparent substrate SUB1 and the transparent substrate SUB2 are fixedly formed on the transparent substrate SUB2. These spacers SP are made of columnar spacers fixed to the transparent substrate SUB2, and are formed by subjecting a resin film applied to cover the counter electrode CT on the transparent substrate SUB2 to selective etching using photolithography techniques.

Therefore, the spacers SP can be accurately formed at the desired locations of each of the pixel areas by the desired number per pixel area. Accordingly, in Embodiment 1, the spacers SP are formed so that their vertex portions are respectively disposed to be opposed to the desired ones of the convex portions of the pixel electrodes PX.

Incidentally, an alignment film ORI2 is formed to cover the spacers SP on the liquid-crystal-side surface of the transparent substrate SUB2.

In the liquid crystal display device constructed in the above-described manner, since positions at which to form the respective spacers SP can be defined during designing, it is possible to prevent the non-uniformity of the gap between the opposed transparent substrates of each individual liquid crystal display device, and it is also possible to reduce greatly the in-plane irregularity of such gap.

In particular, since the spacers SP are disposed to be opposed to the desired ones of the convex portions of the pixel electrodes PX, it is possible to decrease the height of the spacers SP required to ensure the necessary layer thickness of the liquid crystal. Accordingly, during the formation of the spacers SP having a predetermined height, it is possible to reduce the irregularity of the height.

Furthermore, in the case where each of the columnar spacers SP has a taper widened toward its fixed portion, it is possible to reduce the area of its vertex portion as well as the area of the fixed portion. This fact contributes to an improvement in the aperture ratio per pixel area.

Embodiment 2.

Figure 5:
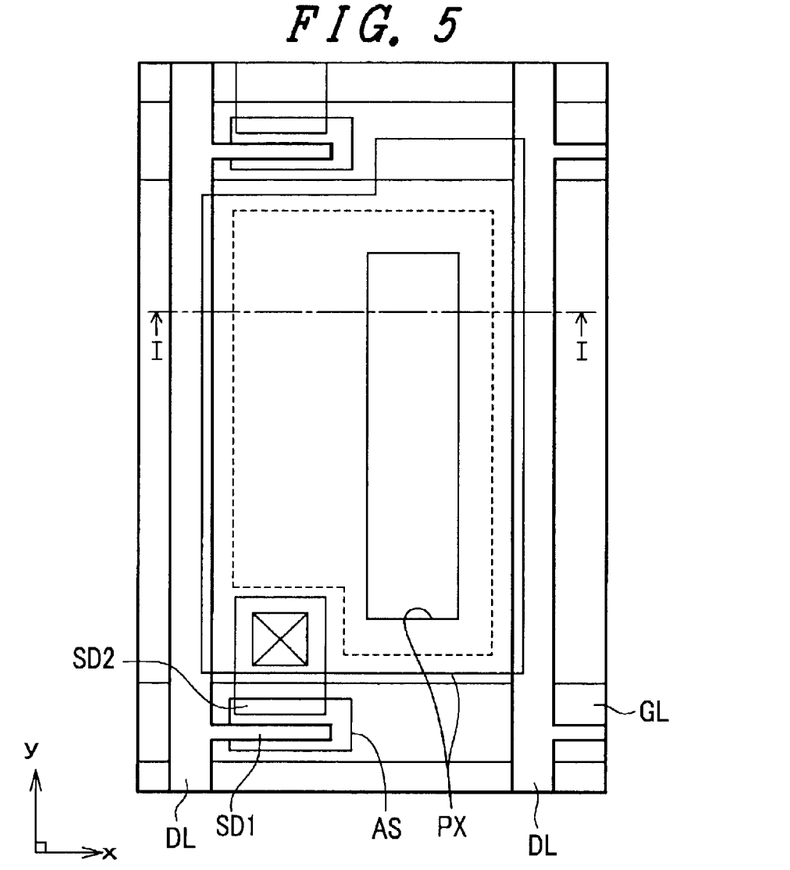
FIG. 5 is a plan view showing another embodiment of the pixel area of the liquid crystal display device according to the invention.
Figure 6:
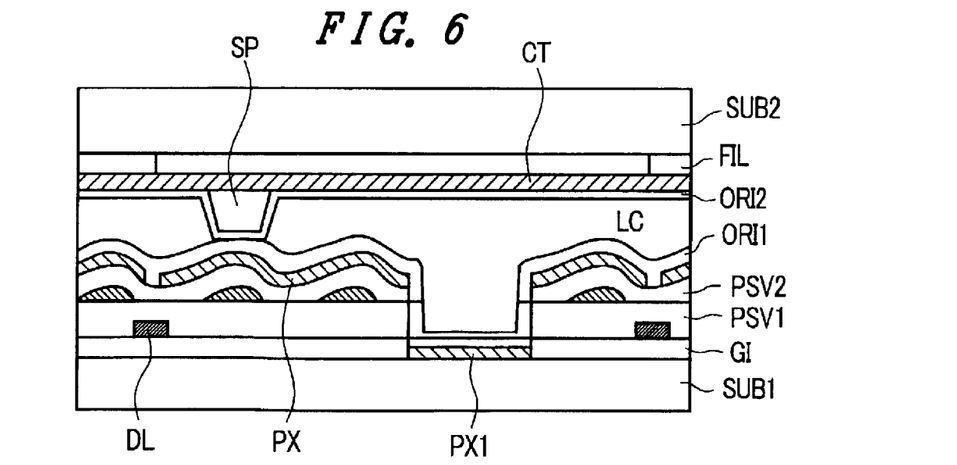
FIG. 6 is a cross-sectional view taken along line VI—VI of FIG. 5.

FIG. 5 is a plan view showing another embodiment of the pixel area of the liquid crystal display device according to the invention, and corresponds to FIG. 3. FIG. 6 is a cross-sectional view taken along line VI—VI of FIG. 5.

This liquid crystal display device is generally called a semi-transparent type. The construction shown in FIG. 5 differs from that in FIG. 1 in that an aperture is formed in an area of the pixel electrode PX which also serves as a reflector, in such a manner as to extend through the protective films PSV2 and PSV1 and the insulating film GI all of which underlie the pixel electrode PX, and a pixel electrode PX1 made of, for example, ITO (Indium Tin Oxide) is formed on the surface of the transparent substrate SUB1 within the aperture.

Incidentally, an extended portion of the pixel electrode PX1 is connected to the source electrode SD2 of the thin film transistor TFT via a through-hole formed in the insulating film GI, whereby the pixel electrode PX1 is kept at the same potential as the pixel electrode PX.

Even in this liquid crystal display device, similarly to the case shown in FIG. 1, the columnar spacer SP is formed on the transparent substrate SUB2, and the spacer SP is formed so that the vertex portion is disposed to avoid the area of the pixel electrode PX in which the aperture is formed, and to be opposed to any one of the convex portions of the pixel electrode PX.

The liquid crystal display device having this construction can serve an advantage similar to that of the liquid crystal display device shown in FIG. 1.

Embodiment 3.

According to Embodiment 3, in the construction shown in each of FIGS. 3 and 5 by way of example, the vertex portion of the spacer SP which is opposed to any one of the convex portions of the pixel electrode PX is disposed so that the vertex portion is not opposed to other convex portions adjacent to the opposed convex portion.

Figure 7A:
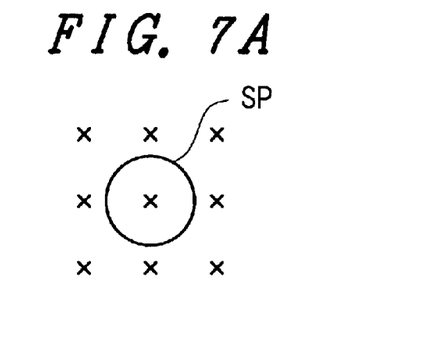
FIGS. 7A and 7B are explanatory views showing the positional relationship between a columnar spacer and an uneven portion of a pixel electrode in the liquid crystal display device according to the invention.

As shown in FIG. 7A by way of example, in the case where the convex portions of the pixel electrode PX (in FIG. 7A, each of the vertex portions is denoted by "x") are disposed at almost equal intervals in each of the x and y directions, the spacer SP having a vertex portion opposed to one of the convex portions is disposed in such a manner as not to be opposed to other convex portions which are adjacent to the opposed convex portion in the x and y directions, and the area of the vertex portion of the spacer SP is also set in the same manner.

Figure 7B:
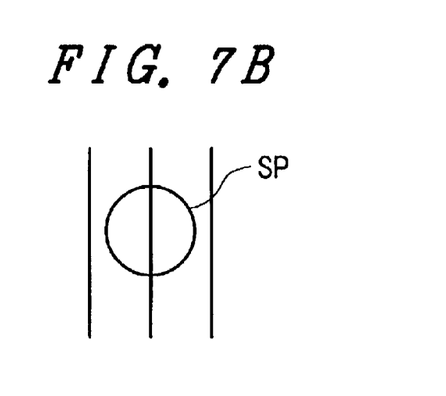

As shown in FIG. 7B by way of example, in the case where the convex portions of the pixel electrode PX are formed in a wave-like shape, the spacer SP having a vertex portion opposed to one of the convex portions (in FIG. 7B, the vertex portion of each of the convex portions is denoted by a straight line) is disposed in such a manner as not to be opposed to other convex portions which are adjacent to the opposed convex portion. In addition, the area of the vertex portion of the spacer SP is set in the same manner.

The reason for this is to prevent degradation of gap accuracy which occurs when the vertex portion of the spacer SP is opposed to two adjacent convex portions of the pixel electrode PX if both convex portions have different heights.

Incidentally, it goes without saying that the construction described in Embodiment 3 can also be applied to other embodiments which will be described below.

Embodiment 4.

Figure 8:
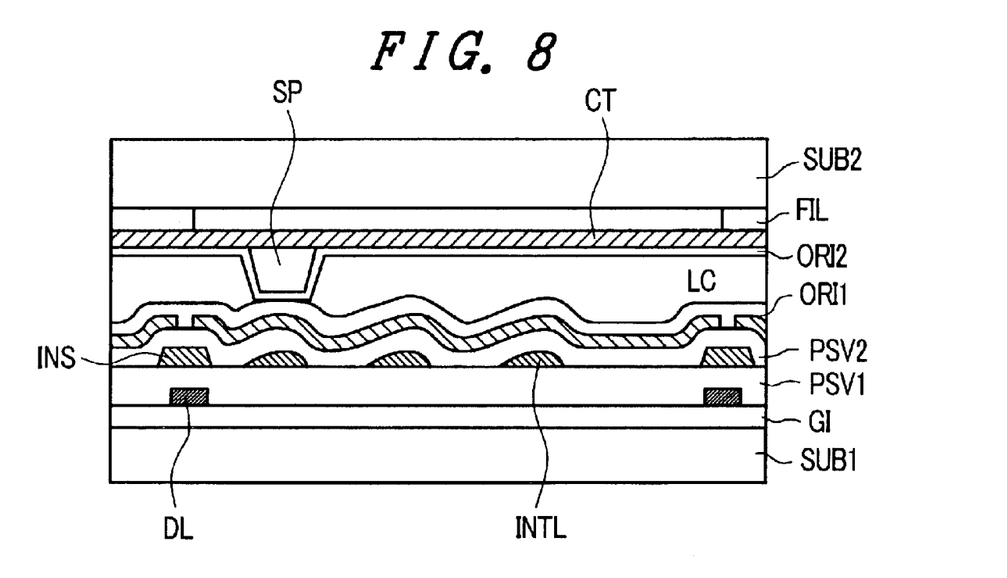
FIG. 8 is a cross-sectional view showing another embodiment of the liquid crystal display device according to the invention.

FIG. 8 is a cross-sectional view showing another embodiment of the pixel area of the liquid crystal display device according to the invention, and corresponds to FIG. 1.

The construction shown in FIG. 8 differs from that shown in FIG. 1 in that an insulating layer INS which extends over the drain signal line DL in the running direction thereof and is, for example, wider than the drain signal line DL is interposed between the protective film PSV1 and the protective film PSV2.

The insulating layer INS can be formed of the same material and in the same process as, for example, the intermediate layers INTL for forming the uneven portion on the surface of the protective film PSV1.

In the liquid crystal display device constructed in this manner, since the distance between the drain signal line DL and the pixel electrode PX can be made large by the insulating layer INS, it is possible to reduce the capacitance between the drain signal line DL and the pixel electrode PX, whereby it is possible to restrain the occurrence of luminance irregularity or smears.

Embodiment 5.

Figure 9:
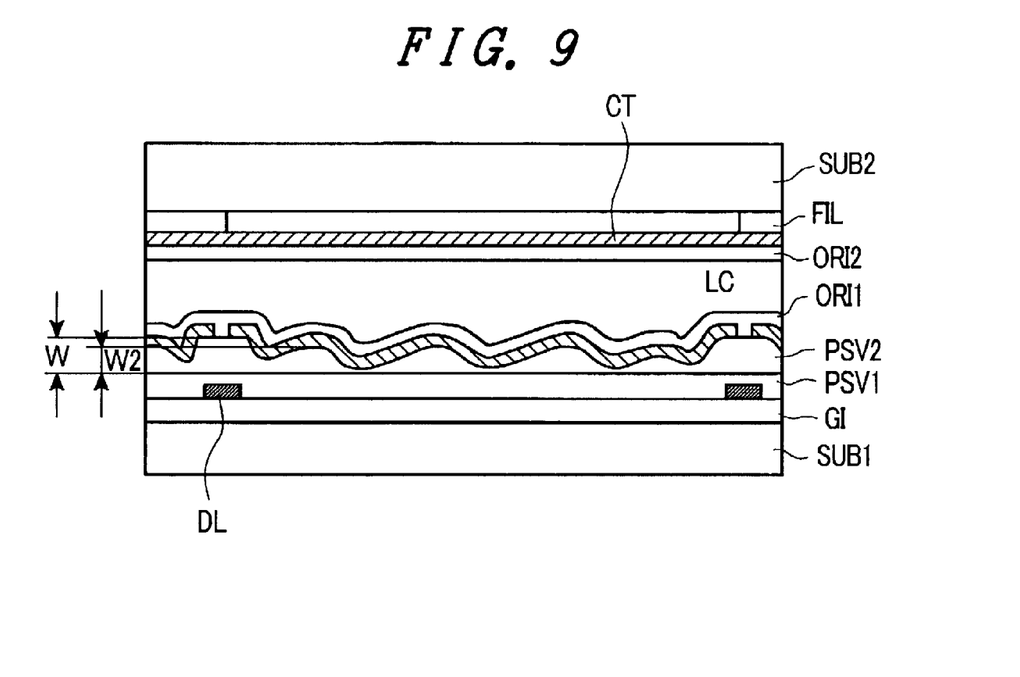
FIG. 9 is a cross-sectional view showing another embodiment of the liquid crystal display device according to the invention.

FIG. 9 is a cross-sectional view showing another embodiment of the pixel area of the liquid crystal display device according to the invention, and corresponds to FIG. 1.

The construction shown in FIG. 9 differs from that shown in FIG. 1 in that a height W of the portion of the protective film PSV2 that overlaps the drain signal line DL is made larger than the height of any of the convex portions of an uneven portion formed on the protective film PSV2 within the pixel area. In addition, the uneven portion is formed on the surface of the protective film PSV2 without the intermediate layers INTL.

Even in the liquid crystal display device constructed in this manner, similarly to the case shown in FIG. 8, since the distance between the drain signal line DL and the pixel electrode PX can be made large, it is possible to reduce the capacitance between the drain signal line DL and the pixel electrode PX.

The uneven portion formed on the surface of the protective film PSV2 in the above-described manner is formed to have three different heights with respect to the bottom surface of the protective film PSV2. A method of forming this protective film PSV2 will be described later.

Embodiment 6.

Figure 10:
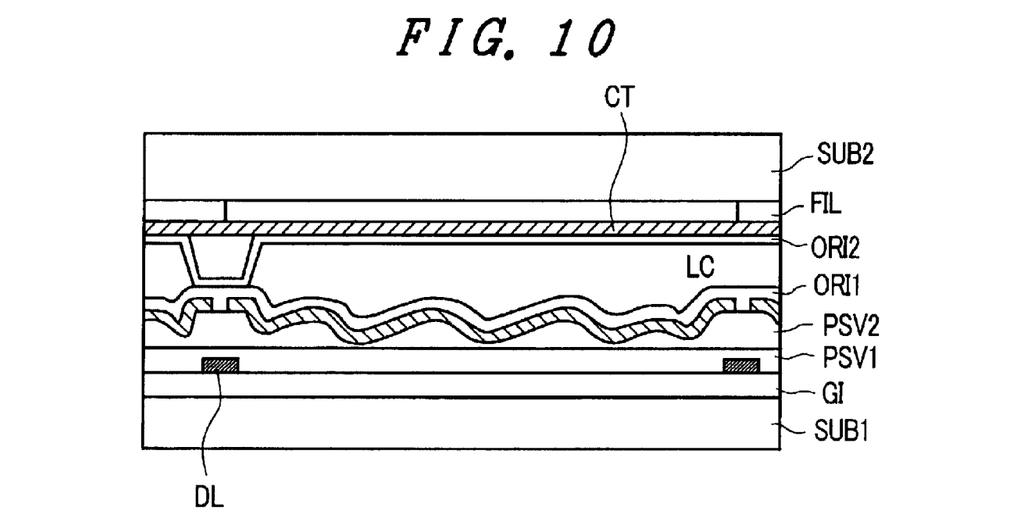
FIG. 10 is a cross-sectional view showing another embodiment of the liquid crystal display device according to the invention.

FIG. 10 is a cross-sectional view showing another embodiment of the pixel area of the liquid crystal display device according to the invention, and corresponds to FIG. 9.

Embodiment 6 presumes the construction shown in FIG. 6, and the spacer SP formed on the transparent substrate SUB2 is disposed so that the vertex portion is opposed to the drain signal line DL.

Specifically, the spacer SP is positioned at the highest portion of the surface of the transparent substrate SUB1 within the pixel area, whereby the height of the spacer SP can be reduced.

Embodiment 7.

FIG. 11 is a view showing the process of one embodiment of a method of manufacturing a liquid crystal display device according to the invention.

FIG. 11 shows a method of forming the protective film PSV2 whose surface has an uneven portion having three different heights with respect to the bottom surface in each of the constructions shown in FIGS. 9 and 10.

Figure 11A:
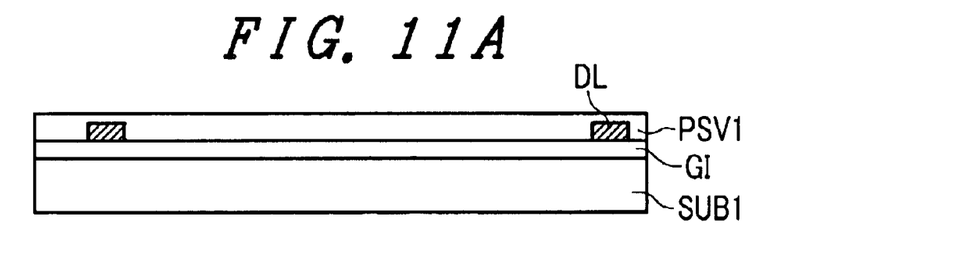
FIG. 11 is a process diagram showing one embodiment of a method of manufacturing a liquid crystal display device according to the invention.

Step 1 (FIG. 11A)

The transparent substrate SUB1 having a liquid-crystal-side surface on which the insulating film GI and the protective film PSV1 are formed is prepared.

Figure 11B:
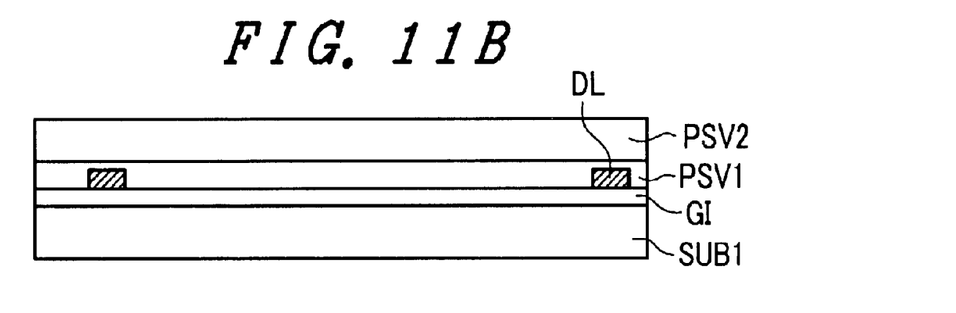

Step 2 (FIG. 11B)

An organic material layer is formed by application on the surface of the protective film PSV1 of the transparent substrate SUB1, whereby the protective film PSV2 is formed on the surface of the protective film PSV1. In Step 2 of this embodiment, the material of the organic material layer is selected from among photocuring materials having photosensitivity like that of so-called photoresist.

The surface of the protective film PSV2 is formed to be comparatively flat.

Figure 11C:
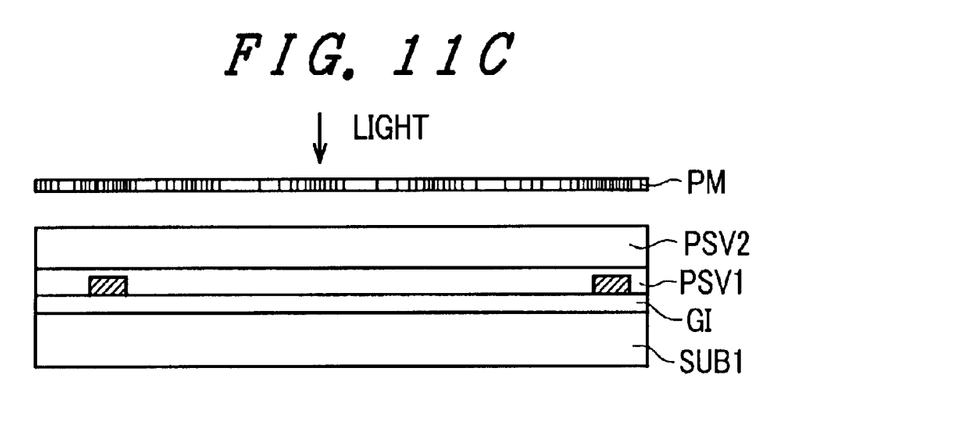

Step 3 (FIG. 11C)

The surface of the protective film PSV2 is sensitized by selective exposure using a photomask PM.

In this case, the photomask PM is made high in transparency in portions corresponding to individual areas on the surface of the protective film PSV2 in each of which a convex portion is to be formed, and is made high in opaqueness in portions corresponding to individual areas on the surface of the protective film PSV2 in each of which a concave portion is to be formed.

The photomask PM is formed to vary smoothly from transparency to opaqueness in a region which extends from a portion corresponding to each of the areas in which the respective convex portions are to be formed to a portion corresponding to an adjacent one of the areas in which the respective concave portions are to be formed.

In addition, since the portion of the protective film PSV2 that overlaps the drain signal line DL formed on the transparent substrate SUB1 is to be formed into the highest convex portion within the pixel area, the transparency of the photomask PM needs to be made higher in an area corresponding to the highest convex portion than in areas corresponding to the other convex portions.

In the case where the opaqueness and transparency of this photomask PM are to be made different in degree, it is desirable that the amount of light to be transmitted through the photomask PM can be adjusted on a location-by-location basis. A specific construction may be such that a plurality of juxtaposed slits are formed in an opaque film formed on the photomask PM to adjust the amount of light with the width of each of the slit or such that an opaque film whose film thickness can be varied to vary the amount of light to be transmitted therethrough is formed on the photomask PM to adjust the amount of light to be transmitted through the photomask PM.

It goes without saying that the material of the protective film PSV2 need not necessarily be limited to the photocuring material and a photodegradable material may also be used.

In this case, the transparent areas and the opaque areas of the photomask PM are formed to have the reverse relationship.

Figure 11D:
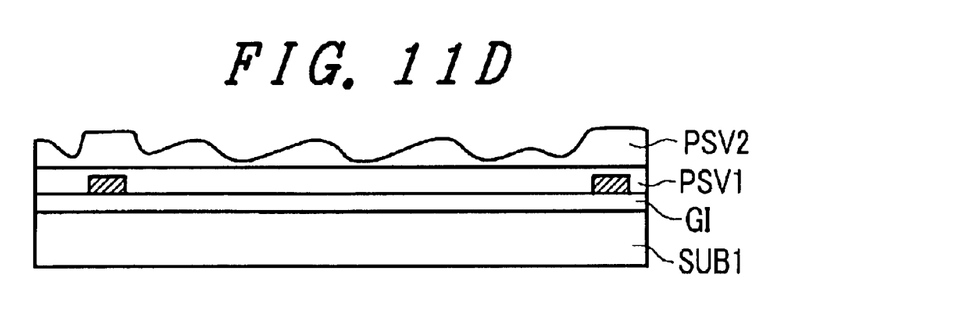

Step 4 (FIG. 11D)

After the completion of selective exposure whose exposure amount differs in degree on a location-by-location basis, the protective film PSV2 is developed, whereby an uneven portion is formed on the surface of the protective film PSV2.

Embodiment 8.

Figure 12:
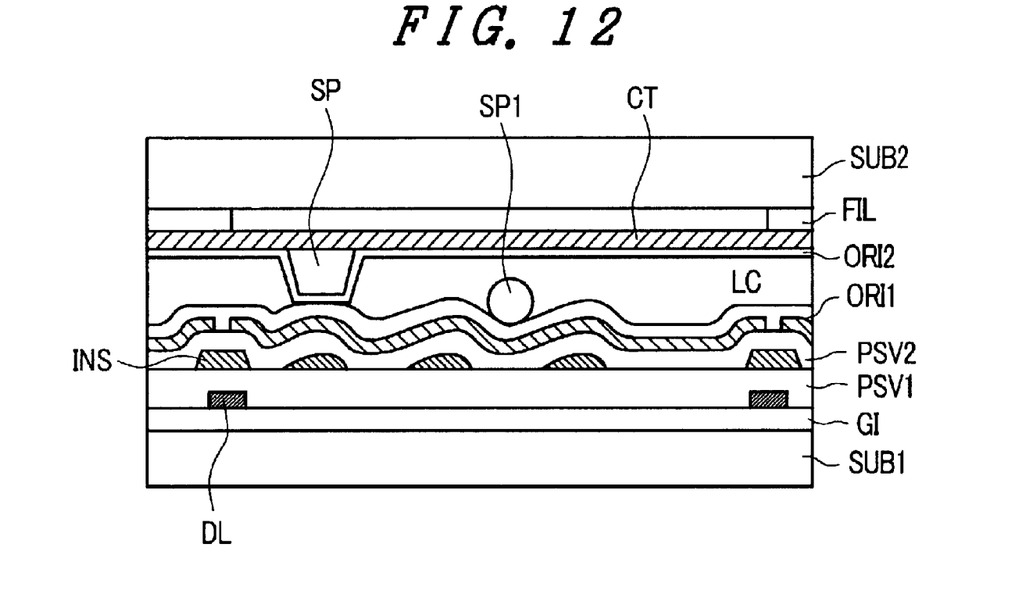
FIG. 12 is a cross-sectional view showing another embodiment of the liquid crystal display device according to the invention.

FIG. 12 is a cross-sectional view showing another embodiment of the pixel area of the liquid crystal display device according to the invention, and corresponds to FIG. 8.

The construction shown in FIG. 12 differs from that shown in FIG. 8 in that spacers for ensuring the gap between the transparent substrate SUB1 and the transparent substrate SUB2 use not only the columnar spacers SP but also bead-shaped spacers SP1.

In the case where the columnar spacers SP are used as such spacers, the gap between the transparent substrate SUB1 and the transparent substrate SUB2 can be controlled with high accuracy, and the gap can also be made narrow. However, there is a risk that the columnar spacers SP may be destroyed when external force is applied to either of the transparent substrates SUB1 or SUB2.

The bead-shaped spacers SP1 are intended to solve this problem, and originally are not used for ensuring the gap between the transparent substrate SUB1 and the transparent substrate SUB2. Accordingly, the diameter of each of the bead-shaped spacers SP1 may be smaller than the size of the desired gap (for example, 3 $\mu$m).

In addition, it is preferable that the number of the bead-shaped spacers SP1 per unit area be greater than the number of the columnar spacers SP per unit area.

Specifically, it is preferable to form two or more bead-shaped spacers SP1 per pixel with respect to one columnar spacer SP per pixel, or one or more bead-shaped spacers SP1 per pixel with respect to one columnar spacer SP per plural pixels. Otherwise, it is preferable to form pixels so that the number of pixels in which the bead-shaped spacers SP1 exist becomes greater than the number of pixels in which the columnar spacers SP exist.

Although in the above description it has been stated that the diameter of each of the bead-shaped spacers SP1 may be comparatively small, the diameter of each of the bead-shaped spacers SP1 may be larger than the height of each of the columnar spacers SP. In this case, by forming the bead-shaped spacers SP1 from a material having elasticity, the bead-shaped spacers SP1 can function as effective spacers together with the columnar spacers SP.

Embodiment 9.

In Embodiment 9, at least one of the transparent substrates SUB1 and SUB2 is made of a glass substrate of less than 0.5 mm in thickness on the premise that the spacers for ensuring the gap between the transparent substrate SUB1 and the transparent substrate SUB2 are realized by the columnar spacers SP and the bead-shaped spacers SP1.

In the case where the glass substrate of less than 0.5 mm in thickness is used, deformation increases owing to external force applied to the glass substrate, but the gap is ensured by the spacers described previously in at least any of Embodiments 1 to 8.

For the same reason, it goes without saying that at least one of the transparent substrates SUB1 and SUB2 may be made of plastic or resin.

Embodiment 10.

Figure 13:
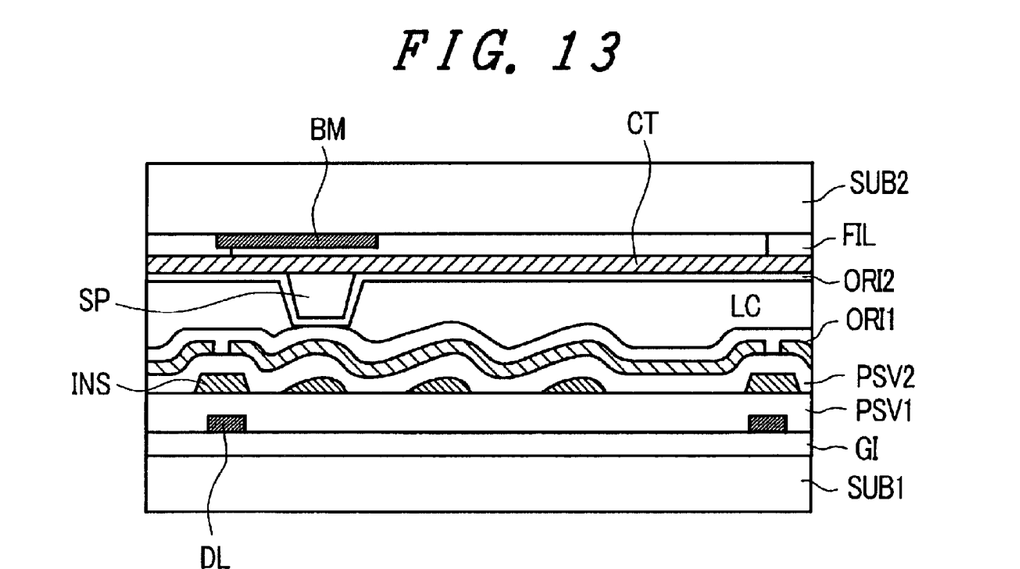
FIG. 13 is a cross-sectional view showing another embodiment of the liquid crystal display device according to the invention

FIG. 13 is a cross-sectional view showing another embodiment of the liquid crystal display device according to the invention, and corresponds to FIG. 8.

The construction shown in FIG. 13 differs from that shown in FIG. 8 in that each columnar spacer SP is formed on the transparent substrate SUB2 in such a manner that a light-shielding film BM which overlaps the columnar spacer SP and covers the peripheral portion thereof is interposed at the position of the fixed portion of the columnar spacer SP.

The light-shielding film BM is provided for preventing light leak due to the columnar spacer SP formed to have a volume larger than that of the bead-shaped spacer SP1.

The light-shielding film BM is formed between, for example, the transparent substrate SUB2 and the color filter FIL, and is formed of, for example, a resin containing a black pigment.

Incidentally, it goes without saying that although in Embodiment 10 the light-shielding film BM is formed on the transparent substrate SUB2, the light-shielding film BM may also be formed on the transparent substrate SUB1.

As a matter of course, such light-shielding film BM can be applied to each of the above-described embodiments.

As is apparent from the foregoing description, in accordance with the liquid crystal display device according to the invention, it is possible to improve the accuracy of the gap between the substrates.

What is claimed is:

1. A liquid crystal display device comprising:
    a reflector formed in at least a part of each pixel arm on a liquid-crystal-side surface of one of substrates disposed in opposition to each other with a liquid crystal layer interposed therebetween, the reflector serving to reflect light incident from the other substrate;
    an uneven portion formed on a reflection surface of the reflector; and
    columnar spacers formed on a liquid-crystal-side surface of the other substrate, each of the columnar spacers being disposed with its vertex portion being opposed to a convex portion of the reflector and being not opposed to other convex portions adjacent to the convex portion.

2. A liquid crystal display device comprising:
    a plurality of gate signal lines disposed to be juxtaposed on a liquid-crystal-side surface of one of substrates disposed in opposition to each other with a liquid crystal layer interposed therebetween;
    a plurality of drain signal lines disposed to be juxtaposed to intersect the plurality of gate signal lines on the liquid-crystal-side surface of the one of the substrates; and
    pixel areas each of which is made of an area surrounded by adjacent ones of the plurality of gate signal lines and adjacent ones of the plurality of drain signal lines,
    each of the pixel areas being provided, with a switching element to be operated by a scanning signal from a gate signal line and a pixel electrode to which an image signal from a drain signal line is supplied via the switching element,
    the pixel electrode having a reflector function and being formed on an upper surface of a protective film made of an organic material layer formed to cover the drain signal line and the switching element,
    a light scattering surface which reflects unevenness of an uneven portion formed on the upper surface of the protective film being formed on a surface of the pixel electrode,
    a convex portion formed on die protective film over the drain signal line being set to be larger in film thickness than other convex portions.

3. A liquid crystal display device according to claim 2, wherein columnar spacers are formed on a liquid-crystal-side surface of the other substrate, each of the columnar spacers being disposed with its vertex portion opposed to a part of the drain signal line.

4. A liquid crystal display device comprising:
    a reflector formed in at least a part of each pixel area on a liquid-crystal-side surface of one of substrates disposed in opposition to each other with a liquid crystal layer interposed therebetween, the reflector serving to reflect light incident from the other substrate;
    an uneven portion formed on a reflection surface of the reflector, the reflector being provided close to a liquid crystal to such an extent that the liquid crystal is varied in layer thickness by the uneven portion; and
    spacers interposed between the one and the other of the substrates and made of bead-shaped spacers and columnar spacers, the columnar spacers being secured to the other substrate, and each of the columnar spacers being disposed with its vertex portion opposed to a convex portion of the reflector and being not opposed to other convex portions adjacent to the convex portion.

5. A liquid crystal display device according to claim 4, wherein the columnar spacers are greater in number per one or more pixel areas than the bead-shaped spacers.

6. A liquid crystal display device according to claim 4, wherein each of the bead-shaped spacers has elasticity, and has a diameter set, to be greater than a height of each of the columnar spacers.

7. A liquid crystal display device comprising:
    a reflector formed in at least a part of each pixel area an a liquid-crystal-side surface of one of substrates disposed in opposition to each other with a liquid crystal layer interposed therebetween, the reflector serving to reflect light incident from the other substrate;
    an uneven portion formed on a reflection surface of the reflector, the reflector being provided close to a liquid crystal to such an extent that the liquid crystal is varied in layer thickness by the uneven portion; and
    spacers interposed between the one and the other of the substrates and made of bead-shaped spacers and columnar spacers, the columnar spacers being secured to the other substrate, and each of the columnar spacers being disposed with its vertex portion opposed to a convex portion of the reflector and being not opposed to other convex portions adjacent to the convex portion,
    at least one of the substrates being set to be less than 0.5 mm in thickness, each of the bead-shaped spacers having elasticity and having a diameter set to be greater than a height of each of the columnar spacers.

8. A liquid crystal display device comprising:
    a reflector formed in at least a part of each pixel area on a liquid-crystal-side surface of one of substrates disposed in opposition to each other with a liquid crystal layer interposed therebetween, the reflector serving to reflect light incident from the other substrate;
    an uneven portion formed on a reflection surface of the reflector, the reflector being provided close to a liquid crystal to such an extent that the liquid crystal is varied in layer thickness by the uneven portion; and
    spacers interposed between the one and the other of the substrates and made of bead-shaped spacers and columnar spacers, the columnar spacers being secured to the other substrates and each of the columnar spacers being disposed with its vertex portion opposed to a convex portion or the reflector and being not opposed to other convex portions adjacent to the convex portion, at least one of the substrates being made of plastic or resin, each of the bead-shaped spacers having elasticity and having a diameter set to be greater than a height of each of the columnar spacers.

9. A liquid crystal display device comprising:

a reflector formed in at least a part of each pixel area on a liquid-crystal-side surface of one of substrates disposed in opposition to each other with a liquid crystal layer interposed therebetween, the reflector serving to reflect light incident from the other substrate;

an uneven portion formed on a reflection surface of the reflector; and columnar spacers formed on a liquid-crystal-side surface of the other substrate, each of the columnar spacers being disposed with its vertex portion opposed to a convex portion of the reflector but not opposed to other convex portions adjacent to the convex portion, a light-shielding film which overlaps each of the columnar spacer and covers a peripheral portion thereof being interposed between each of the columnar spacers and the other substrate.

* * * * *